(12) United States Patent
Hufford

(10) Patent No.: US 12,111,618 B1
(45) Date of Patent: Oct. 8, 2024

(54) METRONOME PUSHCART

(71) Applicant: Stephen Hufford, Quincy, IL (US)

(72) Inventor: Stephen Hufford, Quincy, IL (US)

( * ) Notice: Subject to any disclaimer, the term of this patent is extended or adjusted under 35 U.S.C. 154(b) by 281 days.

(21) Appl. No.: 17/898,538

(22) Filed: Aug. 30, 2022

Related U.S. Application Data

(60) Provisional application No. 63/245,983, filed on Sep. 20, 2021.

(51) Int. Cl.
G04F 5/02 (2006.01)
B62B 3/10 (2006.01)
B62B 5/00 (2006.01)
H04R 1/02 (2006.01)
H04R 1/32 (2006.01)

(52) U.S. Cl.
CPC .............. G04F 5/025 (2013.01); B62B 3/10 (2013.01); B62B 5/00 (2013.01); H04R 1/025 (2013.01); H04R 1/323 (2013.01); H04R 2201/025 (2013.01)

(58) Field of Classification Search
CPC .. G04F 5/025; B62B 3/10; B62B 5/00; H04R 1/025; H04R 1/323
See application file for complete search history.

(56) References Cited

U.S. PATENT DOCUMENTS 3,483,945 A * 12/1969 Stanley ................... H04R 1/323 181/143
3,961,684 A * 6/1976 Michael ................. H04R 1/323 181/143
7,114,732 B1* 10/2006 Ismail ...................... B60D 1/00 280/47.35

* cited by examiner

Primary Examiner — Robert W Horn
(74) Attorney, Agent, or Firm — Kyle A. Fletcher, Esq.

(57) ABSTRACT

The metronome push cart is a cart. The metronome push cart is configured for use with a marching band. The metronome push cart comprises a cart structure, a rotating mount, a speaker, and a metronome. The rotating mount attaches to the cart structure. The rotating mount secures the speaker to the cart structure. The cart structure transports the speaker, and metronome while the marching band is performing. The metronome maintains an audible rhythmic sound used to coordinate the musicians in the marching band.

15 Claims, 3 Drawing Sheets

METRONOME PUSHCART

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

This non-provisional application claims priority under 35 USC 119 (e) to United States provisional application U.S. 63/245,983 filed on Sep. 20, 2021 by the inventor: Stephen Hufford of Quincy, IL. This non-provisional application claims United States provisional application U.S. 63/245,983 in its entirety.

SUMMARY OF INVENTION

The metronome push cart is a cart. The metronome push cart is configured for use with a marching band. The metronome push cart comprises a cart structure, a rotating mount, a speaker, and a metronome. The rotating mount attaches to the cart structure. The rotating mount secures the speaker to the cart structure. The cart structure transports the speaker, and metronome while the marching band is performing. The metronome maintains an audible rhythmic sound used to coordinate the musicians in the marching band.

These together with additional objects, features and advantages of the metronome push cart will be readily apparent to those of ordinary skill in the art upon reading the following detailed description of the presently preferred, but nonetheless illustrative, embodiments when taken in conjunction with the accompanying drawings.

In this respect, before explaining the current embodiments of the metronome push cart in detail, it is to be understood that the metronome push cart is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the metronome push cart.

It is therefore important that the claims be regarded as including such equivalent construction insofar as they do not depart from the spirit and scope of the metronome push cart. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
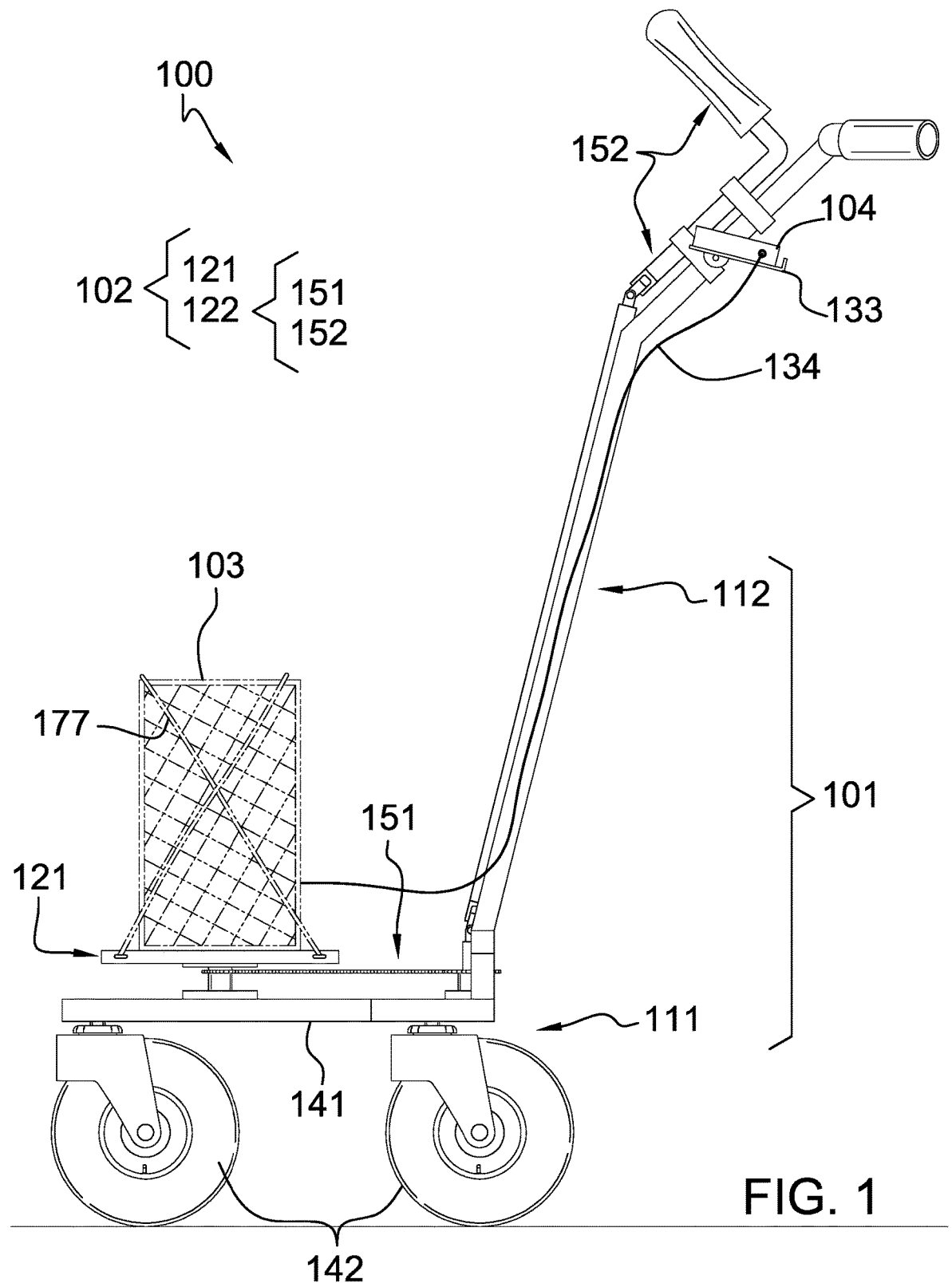
FIG. 1 is a side view of an embodiment of the disclosure.
Figure 2:
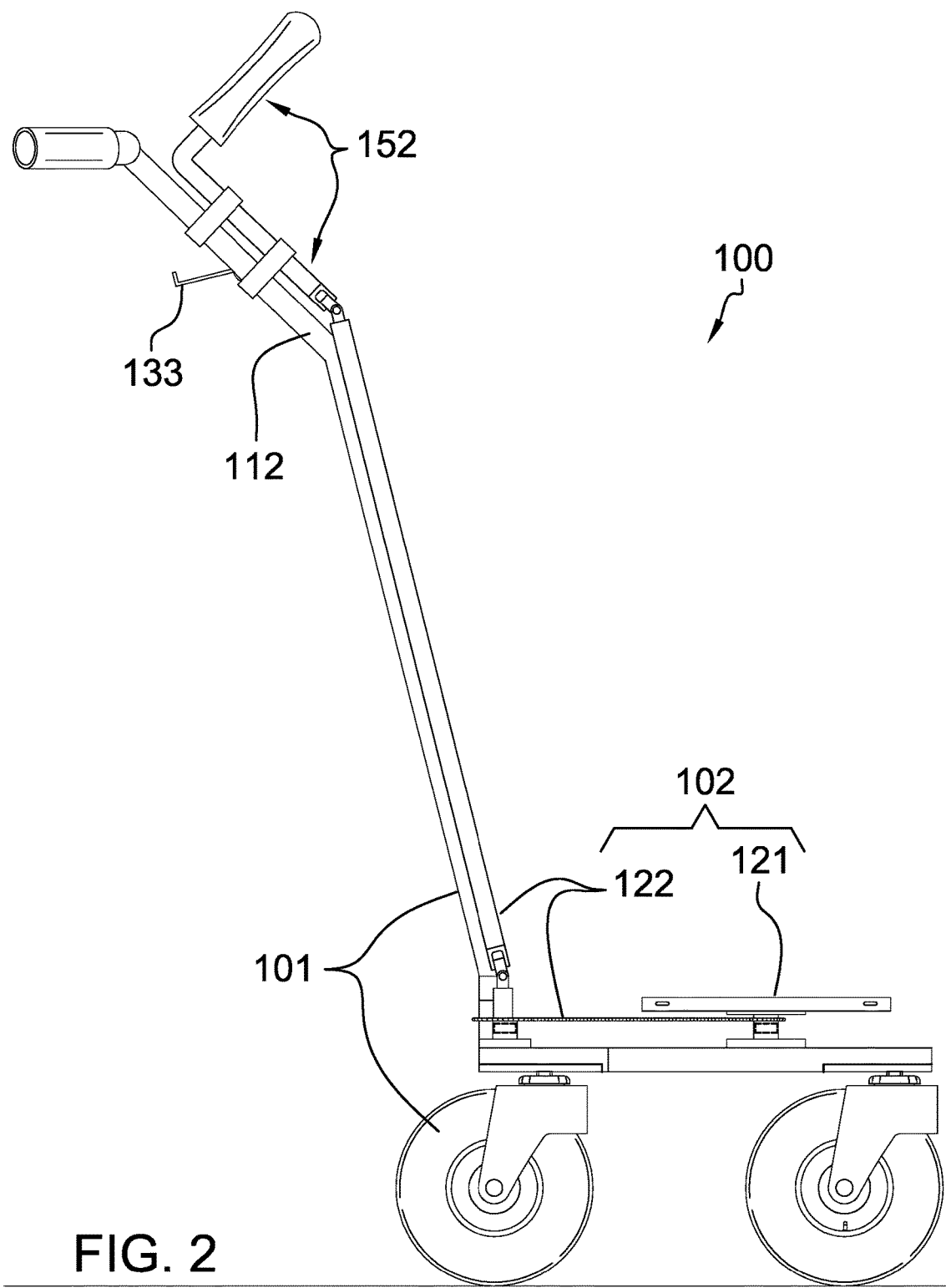
FIG. 2 is a reverse side view of an embodiment of the disclosure.
Figure 3:
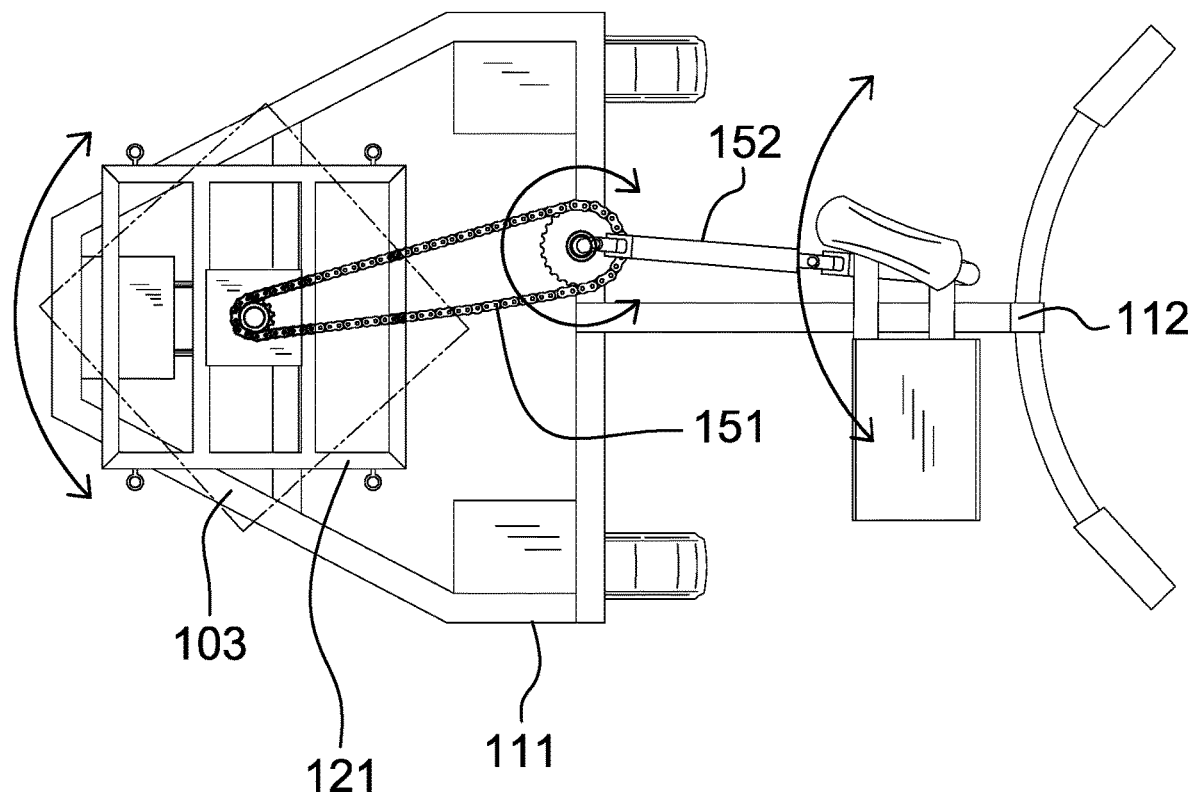
FIG. 3 is a top view of an embodiment of the disclosure.

Detailed reference will now be made to one or more potential embodiments of the disclosure, which are illustrated in FIGS. 1 through 3.

The metronome push cart 100 (hereinafter invention) is a vehicle. The invention 100 is a cart. The invention 100 is configured for use with a marching band.

The invention 100 comprises a cart structure 101, a rotating mount 102, a speaker 103, and a metronome 104. The rotating mount 102 attaches to the cart structure 101. The rotating mount 102 secures the speaker 103 to the cart structure 101. The cart structure 101 transports the speaker 103 while the marching band is performing. The speaker 103 maintains an audible rhythmic sound used to coordinate the musicians in the marching band.

The metronome 104 is a timekeeping device. The metronome 104 generates an audible rhythmic sound. The audible rhythmic sound is played for a marching band by the speaker 103. The audible rhythmic sound generated by the speaker 103 is used to coordinate the musicians in the marching band. The speaker 103 is transported by the cart structure 101 such that the marching band can hear the metronome during a performance.

The cart structure 101 is a cart. The cart structure 101 is a wheeled structure. The cart structure 101 rolls over a supporting surface with the marching band. The cart structure 101 comprises a chassis 111 and a handle structure 112.

The handle structure 112 includes a metronome holder 133. The metronome holder 133 is used to hold the metronome 104 within hands reach of the conductor. Moreover, a cable 134 is connected between the metronome 104 and the speaker 103. The cable 134 is responsible for transmitting an audio signal from the metronome 133 to the speaker 103 so that the speaker 103 is able to broadcast the sound needed to coordinate the musicians in the marching band. The speaker 103 would include at least one battery (not depicted) in order to operate in the manner needed of the invention 100.

The chassis 111 forms the inferior structure of the cart structure 101. The chassis 111 is a wheeled structure. The chassis 111 forms a pedestal that transfers the loads of the rotating mount 102 and the speaker 103 to the supporting surface. The chassis 111 is a load bearing structure. The chassis 111 transfers the loads of the cart structure 101, the rotating mount 102, and the speaker 103 to a supporting surface.

The chassis 111 forms the inferior structure of the cart structure 101. The chassis 111 forms the rolling structure that transports the cart structure 101 and its load over the supporting surface. The chassis 111 further comprises a pedestal plate 141 and a plurality of casters 142.

The pedestal plate 141 is a rigid structure. The pedestal plate 141 is a disk shaped structure. The rotating mount 102 attaches to the superior congruent end of the pedestal plate 141. The congruent ends of the disk structure of the pedestal plate 141 are perpendicular to the axis of rotation of the slewing bearing 121 of the rotating mount 102. The handle structure 112 attaches to the pedestal plate 141. Each caster selected from the plurality of casters 142 mounts on the inferior congruent end of the disk structure of the pedestal plate 141.

Each caster selected from the plurality of casters 142 is a rotating structure. Each caster selected from the plurality of casters 142 transfers a portion of the load of the invention 100 to the supporting surface. The plurality of casters 142 forms the rolling structure that rolls the invention 100 over the supporting surface.

The handle structure 112 is a grip that attaches to the chassis 111. The handle structure 112 is used to push the chassis 111. The handle structure 112 is used to change the direction of the chassis 111.

The rotating mount 102 is an anchoring structure. The rotating mount 102 secures the speaker 103 to the cart structure 101. At least one securing member 177 is used to secure the speaker 103 onto the rotating mount 102. The rotating mount 102 rotates relative to the cart structure 101. The rotation of the rotating mount 102 rotates the speaker 103 relative to the cart structure 101. The rotating mount 102 comprises a slewing bearing 121 and a transmission structure 122.

The slewing bearing 121 is a rotating structure. The slewing bearing 121 is defined elsewhere in this disclosure. The slewing bearing 121 mounts on the superior surface of the pedestal plate 141 of the chassis 111. The slewing bearing 121 rotates relative to the pedestal plate 141. The slewing bearing 121 mounts on the pedestal plate 141 such that the center of rotation of the slewing bearing 121 aligns with the center axis of the disk structure of the pedestal plate 141. The speaker 103 mounts on the slewing bearing 121 such that the rotation of the slewing bearing 121 causes the direction of the audible sounds generated by the speaker 103 to rotate.

The transmission structure 122 is a rotating structure. The transmission structure 122 attaches to the slewing bearing 121. The transmission structure 122 attaches to the handle structure 112. The rotation of the transmission structure 122 rotates the slewing bearing 121 relative to the pedestal plate 141. The transmission structure 122 further comprises a chain drive 151 and a drive lever 152.

The chain drive 151 is a type of belt drive. The chain drive 151 forms a mechanical linkage between the slewing bearing and the drive lever 152. The chain drive 151 transmits rotational energy from the drive lever 152 to the slewing bearing 121. The rotational energy transmitted from the chain drive 151 to the slewing bearing 121 provides the motive forces necessary to rotate the slewing bearing 121 and the speaker 103.

The drive lever 152 is a lever. The drive lever 152 is a rotating structure. The drive lever 152 attaches to the handle structure 112 of the cart structure 101. The drive lever 152 rotates relative to the handle structure 112. The drive lever 152 attaches to the chain drive 151 such that the rotation of the drive lever 152 provides the motive forces used to rotate the chain drive 151, the slewing bearing 121, and the speaker 103.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Bearing: As used in this disclosure, a bearing is a mechanical device that: 1) guides and limits the motion of a moving component relative to a fixed component; and, 2) reduces the friction between the moving component and the fixed component. A locking bearing is a bearing that can be locked such that the rotation of movements secured into a fixed position until the locking bearing is subsequently unlocked. The use of bearings is well known and documented in the mechanical arts.

Belt Drive: As used in this disclosure, the belt drive is a transmission. The belt drive comprises a belt, a drive pulley, one or more transfer pulleys, and a drive mechanism. The belt is threaded around that drive pulley and the one or more transfer pulleys to form a loop. The drive mechanism attaches to the drive pulley such that the rotation of the drive mechanism rotates the belt around the one or more transfer pulleys. The rotation of the belt around the one or more transfer pulleys transfers the rotational energy from the drive mechanism to the one or more transfer pulleys such that each of the one or more transfer pulleys can rotate a load attached to the transfer pulley. A transfer pulley that changes the direction of the track but does not rotate a load is called an idler pulley. A chain drive is a belt drive wherein: a) the belt is replaced by a chain; and each of the drive pulley; and, b) each of the one or more transfer pulleys is a gear structure.

Cant: As used in this disclosure, a cant is an angular deviation from one or more reference lines (or planes) such as a vertical line (or plane) or a horizontal line (or plane).

Cart: As used in this disclosure, a cart is small vehicle intended to be moved by a person. A synonym for cart is hand cart.

Caster: As used in this disclosure, a caster is a wheel that is mounted on a swivel that allows the wheel to adjust, or swivel, the direction of rotation of the wheel to the direction of motion desired for the wheel. The generic parts of a caster are called the stem, the swivel bearing, the swivel mount and the wheel. The swivel bearing attaches the stem to the swivel mount such that the swivel mount will rotate relative to the stem. The wheel attaches to the swivel mount such that the wheel freely rotates relative to the swivel mount. The direction of the axis of rotation of the wheel is perpendicular to the direction of the axis of rotation of the swivel mount. The stem attaches the swivel bearing, the swivel mount, and the wheel to an externally provided object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Chassis: As used in this disclosure, a chassis is a wheeled structure that is used to transport an attached load.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Extension Structure: As used in this disclosure, an extension structure is an inert physical structure that is used to extend or bridge the reach between any two objects.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gear: As used in this disclosure, a gear is a toothed wheel, cylinder, or other toothed mechanical element that is used to transmit motion, a change of speed, or a change of direction to second toothed wheel, cylinder, or other toothed mechanical element.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Interval: As used in this disclosure, the term interval refers to a measure of the distance within an organizational structure between the positions of a first event and a second event that are contained within the organizational structure. The term regular interval is often used to mean that the span of distance between multiple occurrences of the first event and the second event remains constant. This disclosure assumes that the selected second event can be a repetition of the first event. The term interval is often applied to the structure of time and in this context is taken to mean the period of time that passes the first event and the second event.

Lever: As used in this disclosure, a lever is a device that comprises a shaft that rotates around a fulcrum, axis of rotation, or pivot point. Levers are known for generating a mechanical advantage, known as leverage, when they are used to provide rotational force into a rotating mechanical system or device. A lever is an example of a simple machine.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Metronome: As used in this disclosure, a metronome is a device that generates a rhythmic sound at regular intervals. The metronome is used to coordinate the timing of one or more musicians.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Pivot: As used in this disclosure, a pivot is a rod or shaft around which an object rotates or swings.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reach: As used in this disclosure, reach refers to a span of distance between any two objects.

Rhythm: As used in this disclosure, a rhythm refers to a pattern that repeats at regular intervals.

Rotation: As used in this disclosure, rotation refers to the cyclic movement of an object around a fixed point or fixed axis. The verb of rotation is to rotate.

Slewing Bearing: As used in this disclosure, a slewing bearing is a device that is used to rotate an object on a horizontal surface. Slewing bearings are typically load bearing structures Slewing bearings are often called turntable bearings or a lazy Susan bearing.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Swivel: As used in this disclosure, a swivel is a fastening structure that attaches a first object to a second object such that will rotate around an axis of rotation while the second object remains in a fixed position relative to the first object.

Time: As used in this disclosure, time refers to a structure within which the sequence of all events from the past, through present, and into the future can be organized. Time also refers to a measure of the interval between the occurrence of a first event and the occurrence of a second event within the structure of time.

Tool: As used in this disclosure, a tool is a device, an apparatus, or an instrument that is used to carry out an activity, operation, or procedure. A tool generally comprises a working element and a handle.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 3 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A metronome push cart comprising
a cart structure, a rotating mount;
wherein the rotating mount attaches to the cart structure;
wherein the rotating mount is configured to secure a speaker and metronome to the cart structure.

2. The metronome push cart according to claim 1
wherein the cart structure is configured to transport the speaker and the metronome;
wherein the metronome is a timekeeping device;
wherein the metronome generates an audible rhythmic sound.

3. The metronome push cart according to claim 2
wherein the cart structure is a wheeled structure;
wherein the cart structure rolls over a supporting surface.

4. The metronome push cart according to claim 3
wherein the rotating mount is an anchoring structure;
wherein the rotating mount is configured to secure the speaker to the cart structure;
wherein the rotating mount rotates relative to the cart structure;
wherein the rotation of the rotating mount is configured to rotate the speaker relative to the cart structure.

5. The metronome push cart according to claim 4
wherein the cart structure comprises a chassis and a handle structure;
wherein the handle structure attaches to the chassis structure.

6. The metronome push cart according to claim 5
wherein the rotating mount comprises a slewing bearing and a transmission structure;
wherein the transmission structure attaches to the slewing bearing;
wherein the transmission structure attaches to the handle structure.

7. The metronome push cart according to claim 6
wherein the chassis forms the inferior structure of the cart structure;
wherein the chassis is a wheeled structure;
wherein the chassis forms a pedestal that is configured to transfer loads of the rotating mount, the speaker, and the metronome to a supporting surface;
wherein the chassis is a load bearing structure;
wherein the chassis forms the inferior structure of the cart structure;
wherein the chassis forms the rolling structure that transports the cart structure over the supporting surface.

8. The metronome push cart according to claim 7 wherein the handle structure is a grip that attaches to the chassis.

9. The metronome push cart according to claim 8
wherein the handle structure includes a metronome holder;
wherein the metronome holder is configured to hold the metronome;
wherein a cable is operatively connected between the metronome and the speaker.

10. The metronome push cart according to claim 9
wherein the chassis further comprises a pedestal plate and a plurality of casters;
wherein the pedestal plate is a rigid structure;
wherein the pedestal plate is a disk shaped structure;
wherein the rotating mount attaches to the superior congruent end of the pedestal plate;
wherein the congruent ends of the disk structure of the pedestal plate are perpendicular to the axis of rotation of the slewing bearing of the rotating mount;
wherein the handle structure attaches to the pedestal plate;
wherein each caster selected from the plurality of casters mounts on the inferior congruent end of the disk structure of the pedestal plate;
wherein each caster selected from the plurality of casters is a rotating structure;
wherein each caster selected from the plurality of casters transfers a portion of the load of the metronome push cart to the supporting surface;
wherein the plurality of casters forms the rolling structure that rolls the metronome push cart over the supporting surface.

11. The metronome push cart according to claim 10
wherein the slewing bearing is a rotating structure;
wherein the slewing bearing mounts on the superior surface of the pedestal plate of the chassis;
wherein the slewing bearing rotates relative to the pedestal plate;
wherein the slewing bearing mounts on the pedestal plate such that the center of rotation of the slewing bearing aligns with the center axis of the disk structure of the pedestal plate;
wherein at least one securing member is configured to be used to secure the speaker onto the rotating mount;
wherein the speaker mounts on the slewing bearing such that the rotation of the slewing bearing is configured to cause a direction of audible sounds generated by the speaker to rotate.

12. The metronome push cart according to claim 11
wherein the transmission structure is a rotating structure;
wherein the rotation of the transmission structure rotates the slewing bearing relative to the pedestal plate.

13. The metronome push cart according to claim 12
wherein the transmission structure further comprises a chain drive and a drive lever;
wherein the chain drive forms a mechanical linkage between the slewing bearing and the drive lever.

14. The metronome push cart according to claim 13
wherein the chain drive is a type of belt drive;
wherein the chain drive transmits rotational energy from the drive lever to the slewing bearing.

15. The metronome push cart according to claim 14
wherein the drive lever is a lever;
wherein the drive lever is a rotating structure;
wherein the drive lever attaches to the handle structure of the cart structure;
wherein the drive lever rotates relative to the handle structure;
wherein the drive lever attaches to the chain drive such that the rotation of the drive lever provides the motive forces used to rotate the chain drive, the slewing bearing, and operatively the speaker.

* * * * *